Dec. 7, 1926.  S. H. SHERWOOD  1,609,739

BREEDING CRATE

Filed April 5, 1926  3 Sheets-Sheet 1

Inventor:
Stephen Henry Sherwood
By Wilson & McCanna
Attys.

Dec. 7, 1926.
S. H. SHERWOOD
1,609,739
BREEDING CRATE
Filed April 5, 1926     3 Sheets-Sheet 2
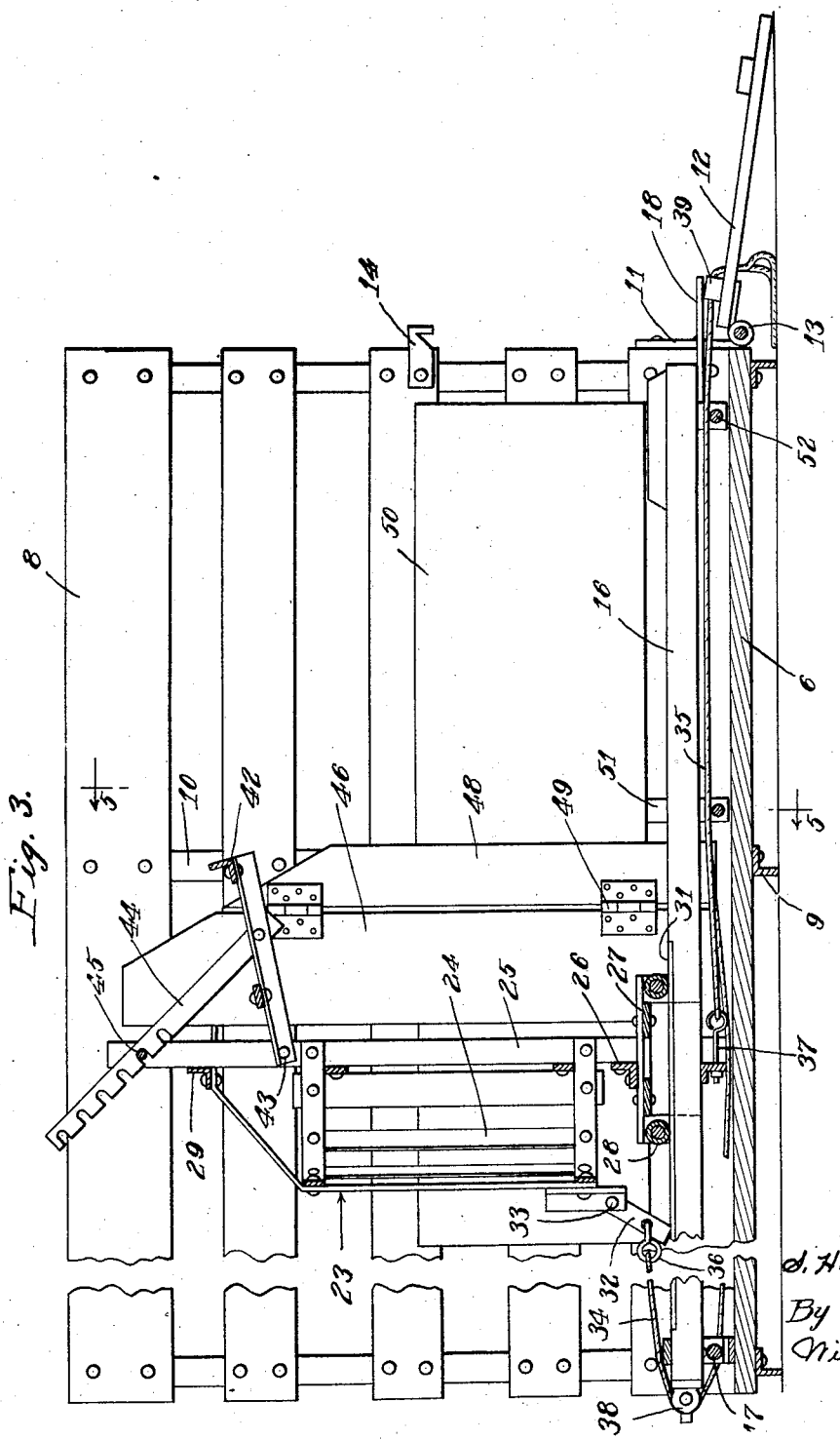

Dec. 7, 1926.  
S. H. SHERWOOD  
BREEDING CRATE  
Filed April 5, 1926  
1,609,739  
3 Sheets-Sheet 3
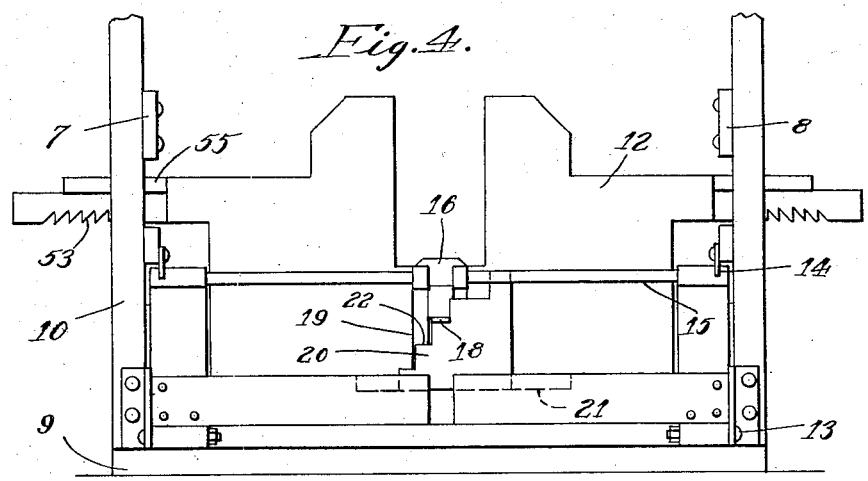
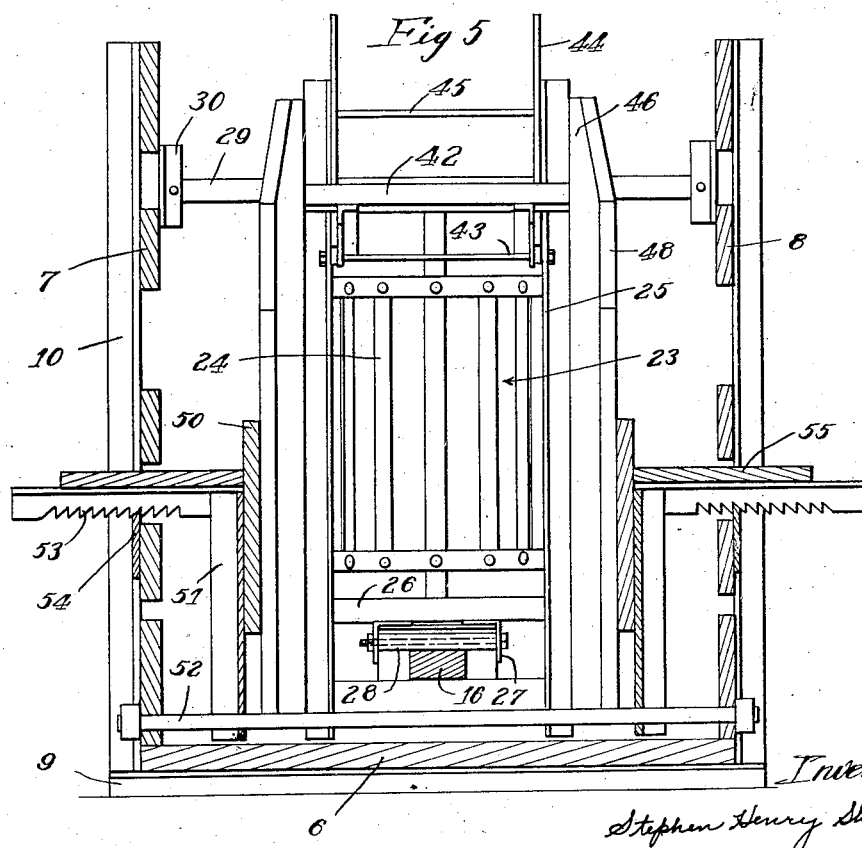

Patented Dec. 7, 1926.

1,609,739

UNITED STATES PATENT OFFICE.

STEPHEN HENRY SHERWOOD, OF PAWPAW, ILLINOIS.

BREEDING CRATE.

Application filed April 5, 1926. Serial No. 99,693.

This invention relates to breeding crates particularly designed for hog breeding purposes.

The principal object is to provide a simple and practical form of crate of this kind wherein provisions are made for all contingencies to securely and positively confine the animal without danger of injury by pinching and binding or generally worrying the same.

Another object is to provide a practically universally adjustable crate to suit different sizes of hogs wherein the adjustments can all be made easily and quickly by an attendant standing at the rear end of the crate at the end the hog enters, an advantageous feature being the elimination of operating levers and the provision of simple and more direct means of adjusting the different phases of the crate.

More specifically stated, the present improved crate incorporates the following features:

First, a novel head cage adjustable forwardly and rearwardly by a simple means operable from behind the crate, the cage being preferably mounted on the straddle bar which is usually provided.

Second, the provision on the cage of a novel form of adjustable neckyoke to suit different heights of hogs and adjustable neck confining boards hinged vertically at opposite sides of the cage to fold in behind the same alongside the hog's neck and across the shoulders.

Third, the provision of the neck confining boards in a sectional form, the sections being hinged together so as to conform to the animal more comfortably.

Fourth, the provision of side confining boards which are easily adjustable from behind the crate and may be set in any position of adjustment comfortably confining the animal.

Fifth, the provision in this connection of the neck confining boards so arranged with respect to the side confining boards as to fold in when the latter are moved together.

Sixth, the further provision, in this connection, of an adjustable back strap between the side confining boards adjustable in relation to the straddle bar.

Seventh, the provision of laterally reaching platforms extending outwardly from the side confining boards between the latter and the side walls of the crate, and Last, the provision, in connection with the straddle bar which is adjustable to different elevations in inclined positions, of means on the tail gate for holding the bar in its adjusted position.

The invention is illustrated in the accompanying drawings wherein,

Fig. 3 is a central vertical longitudinal section on an enlarged scale taken on the line 3—3 of Fig. 2 looking in the direction of the arrows, a portion of the length of the crate being broken away;

Fig. 4 is a rear end view of the crate with the tail gate up, the upper portion of the crate being broken off; and Fig. 5 is a transverse section taken on the line 5—5 of Fig. 3 looking forwardly.

Throughout the views the same reference numerals are applied to corresponding parts.

Figure 1:
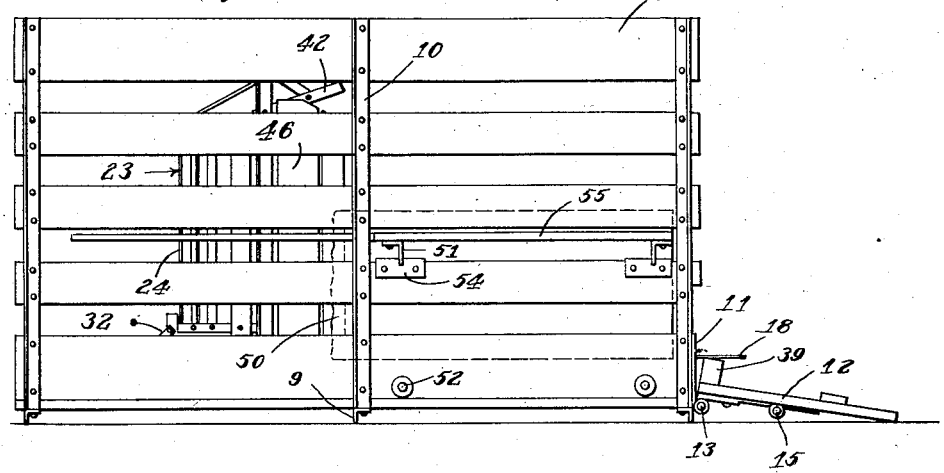
Figure 1 is a side view of a hog breeding crate constructed in accordance with my invention, a part of one of the side confining boards being broken away so as not to obscure the head cage thereby and the tail gate of the crate being shown folded down for the entry of the hog.

The crate comprises a frame of sturdy construction providing a bottom 6 and spaced side walls 7 and 8 joined together by angle iron cross-members 9 and uprights 10 and suitably braced at the one end by diagonal strips 11. A tail gate 12 is hinged, as shown at 13, across the end of the bottom 6 at the rear end of the crate and, when folded down as shown in Fig. 1, provides an approach or runway leading into the crate. Latches 14 may be provided of any suitable form at the sides of the crate for holding the gate raised in closed position, these latches engaging over the end of a crossrod 15. A straddle bar 16 extends lengthwise relative to the bottom 6 and is pivoted at its forward end in a bracket 17 secured to the bottom 6 approximately midway between the sides 7 and 8. The straddle bar is arranged to be raised to inclined position between the hog's legs and held in its elevated position by means of a piece 18 extending off the free end of the bar through an opening 19 provided at the middle of the gate 12. The piece 18 provides a convenient handle for raising the bar and a plate 20 slidable in a guideway 21 provided on the gate 12 and engaging behind the crossrod 15 has steps 22 thereon any one of which may support the piece 18, depending on the degree of elevation of the bar. Obviously, the adjustment is effected in a moment and the bar is held securely until released.

A head cage 23 is provided between the side walls 7 and 8 to be adjusted lengthwise of the crate forwardly and rearwardly relative to the gate 12 to suit the overall size of the hog being handled. The cage comprises a muzzle portion 24 mounted on uprights 25 which in turn are supported by a cross member 26 on a frame 27 slidably mounted on the straddle bar 16. Rollers 28 are preferably interposed between the frame 27 and the straddle bar to facilitate the adjustment of the cage back and forth on the bar. A top cross-piece 29 provides laterally reaching arms to brace the cage from the side walls. The cross-piece 29 has pads 30 on the opposite ends thereof to slide freely along the side walls in the movement of the cage. The rollers 28 operate on a track provided by a strip 31 extending lengthwise relative to the bar 16 on the forward end thereof. The strip 31 has a plurality of longitudinally spaced openings therein, or depressions, to receive a latch 32 for holding the cage positively against forward movement, once the same has been set in an adjusted position. The latch 32, as most clearly appears in Fig. 3, is hinged to the front of the muzzle 24, as indicated at 33. The cage may be drawn forward or back by flexible cables 34 and 35 respectively which, as herein shown, are provided as two lengths of a continuous cable looping at the back of the crate, the one end being fastened to the latch 32, as at 36, while the other end is fastened to the bottom of the frame 27, as at 37. The cable length 34 passes about a pulley 38 mounted on the forward end of the straddle bar 16 to serve as a guide and facilitate the movement of the cage. For convenience in adjusting the cage back and forth, the cable length 35 for moving the same to the rear threads through a block 39 and a hole 40 in the gate 12 so as to be spaced to the left from the cable length 34 which threads through a hole 41 in the gate 12 and also through the block 39. Thus, when the right hand cable is pulled, the latch 32 is raised and the cage moved forward. As soon as the cable is then released, the latch 32 drops into a depression in the strip 31 and locks the cage in its adjusted position. When the left hand cable is pulled, the cage is moved to the rear, the latch 32 riding freely from one depression to the next, in an obvious manner, and serving to lock the cage in its final adjusted position when the cable is released.

A neckyoke 42 is hinged to the uprights 25 of the cage 23 at 43 and may be adjusted vertically behind the cage and held in its adjusted position by notched racks 44 engaging on a crossrod 45, in an obvious manner. The adjustment of the neckyoke accommodates the cage to hogs of different heights, the hog being frustrated in any attempt to climb out of the crate by the yoke lying across the crown of the back.

A pair of side neck confining panels or boards 46 is provided at opposite sides of the cage 23 hinged vertically on the cross-members 26 and 29, as shown at 47, whereby they may be swung inwardly behind the cage to lie alongside the hog's neck and thwart any attempt the hog might make to withdraw his snout from the muzzle 24 and turn around. The panels or boards 46 are preferably provided in a sectional form with a free end section 48 hinged to the main section 46, as shown at 49. This construction makes the panels conformable to the hog's body so that it is confined without discomfort. The functioning of the panels 46 is illustrated in Fig. 2.

The panels 46 are moved in from opposite sides of the hog with a pair of vertical side confining boards 50. The latter are mounted on L-shaped frames 51, the vertical legs of which are slidable on crossrods 52 extending between the side walls 7 and 8 while the horizontal legs thereof are provided with ratchet teeth to form an adjusting rack 53 operating on keepers 54 on the side walls 7 and 8. The boards 50 are capable of adjustment to whatever position required, as illustrated in Fig. 2, and serve to prevent the hog from squirming out of position. The adjustment of the boards into position can readily be made by an attendant standing behind the crate after the hog has entered and the tail gate has been raised to closed position. The racks 53 hold the boards securely in position until the hog is to be released, when the outer ends of the frames 51 can be raised to release the teeth of the racks 53 from the keepers 54 to slide the frames 51 outwardly along the rods 52 to an out of the way position. The tops of the racks 53 provide supports for horizontal platforms 55 between the boards 50 and the side walls of the frame, the purpose for which will be obvious.

Figure 2:
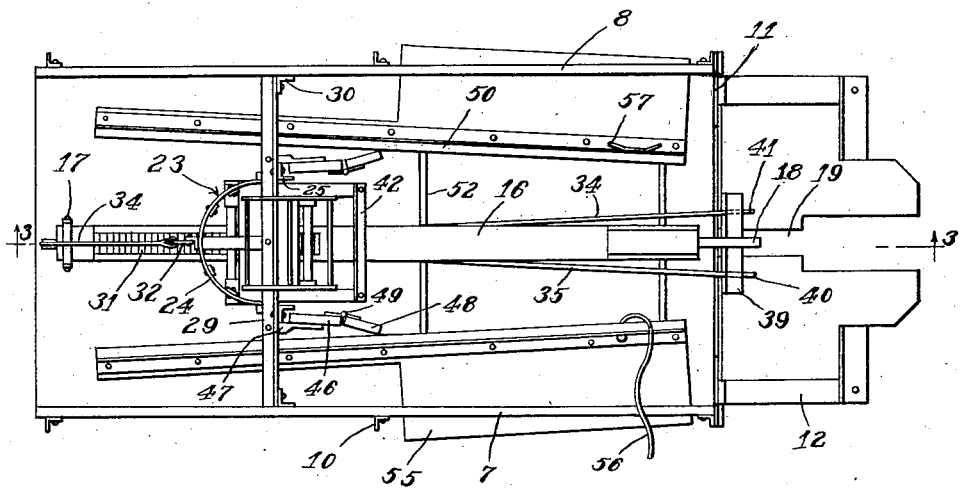
Fig. 2 is a plan view of Fig. 1.

A back strap 56 is provided fastened, as indicated in Fig. 2, to one of the side confining boards 50 to be passed across the hog's back to the other side confining board 50 to be held in the cleat 57 provided on the latter. The tightening of the strap 56 confines the hog in relation to the straddle bar and prevents it from hoisting up out of position in the crate, as by standing on the straddle bar.

In operation a three section hinged panel is usually employed to corral the hog behind the crate. By using the same, the work can be done without chasing or unnecessarily worrying the animal. As soon as the hog has been driven into the crate, the operator raises the end gate 12 which fastens automatically by the latches 14. The cage 23 is then adjusted, the neckyoke or shoulder guard 42 having been previously set to approximately the proper place. Side confining boards 50 are each grasped with one hand and shoved in thus bringing the foot platforms 55 into proper position and, at the same time, swinging the hinged panels or wings 46 against the opposite sides of the hog's head and neck. The back strap 56 is then applied and secured. The hog is meanwhile in an easy position and so closely confined that it will struggle very little. The straddle rail is then raised to the proper position so as to prevent crouching. It will be noted that all these adjustments are easily and quickly performed by the attendant standing behind the crate; also that no levers or other elements are required that might be confusing to operate at the time. That is, all of the phases of the crate are adjusted by more or less direct means. After the hog is thus closely confined, any readjustment of the neckyoke that may appear necessary or desirable may be made.

It is believed that the foregoing conveys a clear understanding of the objects prefaced above and it should be manifest that in putting the invention into practice in various applications of the same, many changes might be made in details of construction without departing from the spirit and scope of the invention as expressed in the appended claims, in which—

I claim:

1. A breeding crate comprising a frame structure providing spaced side walls, a tail gate at one end of said structure, a head cage movable toward and from the other end of said structure longitudinally of said frame, a latch for holding said cage in its adjusted position against forward movement, and flexible elements operable at the tail gate for adjusting said cage back and forth, one of said elements for adjusting said cage forward having connection with said latch for releasing the same.

2. A breeding crate comprising a frame structure providing spaced side walls, a tail gate, a straddle bar extending lengthwise relative to said frame and arranged to be elevated to different degrees, and a head cage mounted on and adjustable along said bar forwardly and rearwardly with respect to said frame and arranged to be elevated with said bar.

3. A breeding crate comprising a frame structure providing spaced side walls, a tail gate, a straddle bar extending lengthwise relative to said frame and arranged to be adjusted to different positions of elevation, a head cage mounted on said bar to be adjusted therewith and being adjustable lengthwise relative thereto and to said frame, and means for bracing said cage laterally with respect to said side walls.

4. A breeding crate comprising a frame structure providing spaced side walls, a tail gate, a straddle bar extending lengthwise relative to said frame and arranged to be adjusted to different positions, a head cage mounted on said bar to be adjusted therewith and being adjustable lengthwise relative thereto and to said frame, and a neckyoke adjustable vertically on the rear side of said cage.

5. A breeding crate comprising a frame structure providing spaced side walls, a tail gate at one end of said frame, a straddle bar extending lengthwise relative to said frame having means at the rear end thereof whereby to elevate the same and to hold the same elevated in different positions, a head cage mounted on said straddle bar to tilt therewith, and means operable at the tail gate for adjusting said cage along said bar.

6. A breeding crate comprising a frame structure providing spaced side walls, a tail gate pivotally mounted at one end of said frame to fold down, means for holding said gate raised, a straddle bar extending lengthwise relative to said frame pivoted at its forward end and arranged to be raised to different positions of inclination, said bar having a part extending through an opening provided in said tail gate whereby the same may be raised, and means mounted on said tail gate for holding said bar in different raised positions.

7. A breeding crate comprising a frame structure providing spaced side walls, a tail gate pivotally mounted at one end of said frame to fold down, means for holding said gate raised, a straddle bar extending lengthwise relative to said frame pivoted at its forward end and arranged to be raised to different positions of inclination, said bar having a part extending through an opening provided in said tail gate whereby the same may be raised, and means mounted on said tail gate for holding said bar in different raised positions, said means comprising a stepped plate slidable transversely in guides on said gate.

8. A breeding crate comprising a frame structure providing spaced side walls, a tail gate pivotally mounted at one end of said frame to fold down, means for holding said gate raised, a straddle bar extending lengthwise relative to said frame pivoted at its forward end and arranged to be raised to different positions of inclination, said bar having a part extending through an opening provided in said tail gate whereby the same may be raised, means mounted on said tail gate for holding said bar in different raised positions, a head cage adjustable forwardly and rearwardly with respect to the front end of said frame, and flexible adjustable means extending crosswise between said side walls to provide a back strap adjustable in relation to said straddle bar near said tail gate.

9. A breeding crate comprising a frame structure providing spaced side walls, a tail gate, a head cage adjustable forwardly and rearwardly relative to said tail gate, a straddle bar extending lengthwise relative to said frame between said cage and gate and adjustable as to elevation, side confining boards adjustable inwardly toward each other from said side walls, vertical sectional panels hinged at opposite sides of said head cage to fold in behind the latter between said side boards, and a flexible adjustable element extending crosswise between said side walls near said tail gate and serving as a back strap adjustable in relation to said straddle bar.

10. A breeding crate comprising a frame structure providing spaced side walls, a tail gate, a head cage adjustable forwardly and rearwardly relative to said tail gate, a straddle bar extending lengthwise relative to said frame between said cage and gate and adjustable as to elevation, a neck yoke adjustable vertically on the rear side of said cage with respect to said straddle bar, side confining boards adjustable inwardly toward each other from said side walls, vertical section panels hinged at opposite sides of said head cage to fold in behind the latter between said side boards, and a flexible adjustable element extending crosswise between said side walls near said tail gate and serving as a back strap adjustable in relation to said straddle bar.

11. A breeding crate comprising a frame structure providing spaced side walls, a tail gate at one end of said frame, a head cage adjustable forwardly and rearwardly with respect to the other end of said frame, a pair of vertical side confining boards adjustable inwardly relative to said side walls between said cage and gate, and a pair of vertical neck confining boards hingedly mounted at opposite sides of said head cage to swing inwardly in back of said cage.

12. A breeding crate comprising a frame structure providing spaced side walls, a tail gate at one end of said frame, a head cage adjustable forwardly and rearwardly with respect to the other end of said frame, a pair of vertical side confining boards adjustable inwardly relative to said side walls between said cage and gate, a pair of vertical neck confining boards hingedly mounted at opposite sides of said head cage to swing inwardly in back of said cage, and a neck-yoke adjustably mounted on the top of said head cage for vertical adjustment in back thereof.

13. A breeding crate comprising a frame structure providing spaced side walls, a tail gate at one end of said frame, a head cage adjustable forwardly and rearwardly with respect to the other end of said frame, a pair of vertical side confining boards adjustable inwardly relative to said side walls between said cage and gate, and means for guiding said boards and for holding the same in adjusted position comprising a crossrod extending between the side walls of said frame at the bottom of said boards having parts of the latter slidable thereon, and toothed racks extending outwardly from the tops of said boards and engaging keepers in the side walls of said frame.

14. A breeding crate comprising a frame structure providing spaced side walls, a tail gate at one end of said frame, a head cage adjustable forwardly and rearwardly with respect to the other end of said frame, a pair of vertical side confining boards adjustable inwardly relative to said side walls between said cage and gate, means for guiding said boards and for holding the same in adjusted position comprising a crossrod extending between the side walls of said frame at the bottom of said boards having parts of the latter slidable thereon, and toothed racks extending outwardly from the tops of said boards and engaging keepers in the side walls of said frame, and horizontal platforms extending outwardly relative to said boards between the latter and the side walls of said frame and carried on said toothed racks.

15. A breeding crate comprising a frame structure providing spaced side walls, a tail gate at one end of said frame, a head cage adjustable relative to the other end of said frame, and a pair of neck confining panels hinged vertically at opposite sides of said cage to swing inwardly to the rear of the latter each of said panels comprising a pair of vertically hinged sections to be shoulder-conforming, and means whereby said panels are moved inwardly and held in adjusted position.

16. A breeding crate comprising a frame structure providing spaced side walls, a tail gate, a straddle bar extending lengthwise relative to said frame between said cage and gate and adjustable up and down to different positions of inclination, and a head cage slidably mounted for adjustment on said bar lengthwise of said crate, and arranged to tilt with said bar.

17. A breeding crate comprising a frame structure providing spaced side walls, a tail gate at one end of said frame, a head cage at the other end of said frame, and a pair of vertical side confining boards adjustable inwardly relative to said side walls between said cage and gate, said boards having horizontal outwardly reaching foot platforms between the same and the side walls of said frame depressed in elevation from the upper edges of said boards.

18. A breeding crate comprising a frame structure providing spaced side walls, a tail gate at one end of said frame, a head cage at the other end of said frame, a pair of vertical side confining boards adjustable inwardly relative to said side walls between said cage and gate, said boards having horizontal outwardly reaching foot platforms between the same and the side walls of said frame depressed in elevation from the upper edges of said boards, and an adjustable back strap extending crosswise between said side boards near said tail gate.

19. A breeding crate comprising a frame structure providing spaced side walls, a tail gate at one end of said frame, a head cage at the other end of said frame, a pair of vertical side confining boards adjustable inwardly relative to said side walls between said cage and gate, said boards having horizontal outwardly reaching foot platforms between the same and the side walls of said frame depressed in elevation from the upper edges of said boards, an adjustable back strap extending crosswise between said side boards near said tail gate, and a straddle bar extending lengthwise relative to said frame between said cage and gate and adjustable up and down relative to said back strap.

20. A breeding crate comprising a frame structure providing spaced side walls, a tail gate at one end of said frame, a head cage adjustable forwardly and rearwardly with respect to the other end of said frame, a pair of side confining boards adjustable in and out with respect to the side walls of said frame between said cage and gate, and a pair of neck confining parts at opposite sides of said cage arranged to be adjusted with said side confining boards in and out in back of said cage.

21. A breeding crate comprising a frame structure providing spaced side walls, a tail gate at one end of said structure, a straddle bar extending lengthwise relative to said structure, a head cage mounted on and adjustable lengthwise of said bar forwardly and rearwardly with respect to said structure, and a latch for holding said cage in its adjusted position operating on said straddle bar.

22. A breeding crate comprising a frame structure providing spaced side walls, a tail gate at one end of said structure, a straddle bar extending lengthwise relative to said structure, a head cage mounted on and adjustable lengthwise of said bar forwardly and rearwardly with respect to said structure, a latch for holding said cage in its adjusted position operating on said straddle bar, and means operable at the tail gate for adjusting said cage toward and away from said tail gate, said means comprising flexible elements one of which is directly connected to said cage for moving the same toward the gate and the other of which has connection with said latch to release the same and to move the cage away from said gate, and a guide at the front end of said structure over which said last mentioned flexible element is arranged to pass.

In witness of the foregoing I affix my signature.

STEPHEN HENRY SHERWOOD.